US006060541A

United States Patent [19]

[11] Patent Number: 6,060,541
[45] Date of Patent: May 9, 2000

Anderson et al.

[54] AQUEOUS COATING COMPOSITIONS FOR SURFACE PROTECTIVE LAYERS FOR IMAGING ELEMENTS

[75] Inventors: Charles C. Anderson, Penfield; Brian A. Schell, Honeoye Falls; Yongcai Wang, Penfield; Mario D. DeLaura, Hamlin, all of N.Y.

[73] Assignee: Eastman Kodak Company, Rochester, N.Y.

[21] Appl. No.: 09/136,217

[22] Filed: Aug. 19, 1998

Related U.S. Application Data

[62] Division of application No. 08/954,373, Oct. 20, 1997, Pat. No. 5,876,910.

[51] Int. Cl.[7] ................................ C08J 3/00; C08K 3/20; C08L 75/00; C08L 89/00; C08L 83/00

[52] U.S. Cl. ............................ 524/22; 524/588; 524/591; 524/838; 524/839; 524/840

[58] Field of Search .................................... 524/588, 591, 524/839, 840, 838, 22

[56] References Cited

U.S. PATENT DOCUMENTS

| | | | |
|---|---|---|---|
| 4,555,443 | 11/1985 | Kikugawa et al. | 428/336 |
| 5,543,171 | 8/1996 | Shores | 427/177 |

*Primary Examiner*—Patrick D. Niland
*Attorney, Agent, or Firm*—Doreen M. Wells; Carl F. Ruoff

[57] ABSTRACT

The present invention is an imaging element which includes a support, at least one image forming layer superposed on the support and a protective overcoat superposed on the support. The protective overcoat is farthest from the support. The protective overcoat is formed by the coating and subsequent drying of a coating composition of an aqueous medium having therein a water dispersible siloxane-containing polyurethane.

6 Claims, No Drawings

AQUEOUS COATING COMPOSITIONS FOR SURFACE PROTECTIVE LAYERS FOR IMAGING ELEMENTS

CROSS REFERENCE TO RELATED APPLICATIONS

This is a divisional of application Ser. No. 08/954,373, filed Oct. 20, 1997 now U.S. Pat. No. 5,876,910.

This application relates to commonly assigned copending application Ser. No. 08/955,013, filed simultaneously herewith and hereby incorporated by reference for all that it discloses.

FIELD OF THE INVENTION

This invention relates to an imaging element with improved physical properties of its surface layer, and in particular to an imaging element comprising a support, at least one image-forming layer, and a surface protective layer. More specifically, this invention relates to such imaging elements having a surface protective layer that is applied from an aqueous medium and exhibits superior surface lubricity and excellent manufacturing characteristics.

BACKGROUND OF THE INVENTION

During the handling of an imaging material, such as coating, drying, finishing, winding, rewinding, printing, projecting, and so on, the material surfaces are often damaged by contact friction with various equipment or as a result of contact between the front and back side of the imaging material. For example, scratches or abrasions can result on the emulsion and back side of a photographic material. These scratches or abrasion marks are visible during printing or projecting processes. This causes serious problems in the practical use of the films. In addition, when the contact friction is high, the imaging materials do not transport smoothly during the manufacturing process or in various exposure, processing, and projection machines. These transport problems may result in product waste. In recent years, the conditions under which the imaging materials are manufactured or utilized have become more severe, because their applications have been extended (for example, in an atmosphere of high humidity and high temperature) or because the methods for their preparation have been advanced (for example, high speed coating, high speed finishing and cutting, and fast processing). Under these conditions, the imaging materials are more easily damaged.

To lower the contact friction and improve the resistance to damage to surfaces, a lubricant or slipping agent is often used. Examples of the lubricants used for these purposes include silicone fluids as described in U.S. Pat. No. 3,489,567, and wax esters of high fatty acids or high fatty alcohols in U.S. Pat. No. 3,121,060. Problems are encountered in the use of these lubricants. For example, waxes such as Carnauba wax have been used to form the backing lubricant layer. However, they need to be coated from solvents such as propylene dichloride, which is on the EPA P/U highly hazardous list. Furthermore, waxes in most cases have to be applied as a separate layer, which requires an additional coating station and therefore increases product cost.

Silicone fluids are frequently used as lubricants, but, they are prone to transferring from one side of the imaging element to the other side when the element is stored or supplied in a wound roll form, such as a photographic film for amateur photography. In addition, since these silicone fluids are insoluble in water they must be dispersed with mechanical energy and, typically, in the presence of large amounts of surfactant, into aqueous coating compositions. This process results in coatings containing silicone fluids dispersed as fairly large droplets which may cause the dried coatings to be hazy in appearance. The large amounts of surfactant used to disperse the silicone fluids may be undesirable since they may cause the coating composition to foam and may compromise the physical properties (for example the barrier properties) of the dried layer.

Siloxane-containing polymers have been described for use in backing layers or slipping layers for imaging materials. U.S. Pat. No. 4,961,997 describes a backing layer for use in a thermal recording medium which comprises a cured product of a mixture of a silicone-modified polyurethane resin and a heat-resistant organic powder. The patent discloses that the backing layer may be applied from organic solvents such as paraffin solvents, aromatic solvents, ketones, alcohols, esters, and their mixtures. The patent does not teach or disclose backing layers applied from aqueous medium.

U.S. Pat. Nos. 4,910,087 and 4,942,212 describe heat-resistant layers for heat-sensitive recording elements in which the heat-resistant layers are made of a polyurethane resin containing a siloxane. These patents disclose applying such layers from organic solvent medium.

U.S. Pat. No. 5,330,840 describes polysiloxane containing polyurethane coatings for rollers and belts useful for toner fusing in electrophotography. The coatings were applied from an organic solvent such as tetrahydrofuran.

U.S. Pat. No. 5,451,495 describes a photographic element comprising a support, at least one light-sensitive silver halide containing layer and a layer comprising a crosslinked polymer having tertiary nitrogen atoms that are converted to quaternary amines. The polymer backbone moieties are polycondensation polymers such as polyurethanes and the crosslinking moieties are siloxanes. However, polymers containing quaternary amines are undesirable for photographic applications due to their propensity to interact with anionic filter dyes leading to possible dye stain after film processing. In addition, the layers were not described as being applied from aqueous medium.

Solvent-soluble siloxane-containing polyimides and polyesters for use in slipping layers for dye-donor elements in thermal dye transfer are described in U.S. Pat. Nos. 5,252,534 and 5,234,889, respectively. These slipping layers were described as being applied from organic solvent medium.

A foremost objective of the present invention is to provide an imaging element having a new surface protective layer composition which can be applied from an aqueous medium. The coating compositions used to form such a surface lubricant layer are stable with respect to manufacturing processes and are attractive from an environmental standpoint. The surface protective layer prepared has excellent lubricity.

SUMMARY OF THE INVENTION

In accordance with the present invention, an imaging element includes a support, at least one image-forming layer, and an outermost protective layer. The protective layer is formed by the coating and subsequent drying of an aqueous coating composition containing a water dispersible, siloxane-containing polyurethane. The surface protective layer of the invention exhibits superior lubricity and excellent manufacturing characteristics.

DESCRIPTION OF THE INVENTION

The coating compositions utilized herein to form the surface protective layer of an imaging element comprise a continuous aqueous phase containing a water dispersible, siloxane-containing polyurethane. Such coating compositions are particularly advantageous because they eliminate the need to utilize undesirable solvents, such as chlorinated solvents, which are otherwise needed to dissolve conventional lubricants. The coating compositions are resistant to flocculation, precipitation, or coagulation of the lubricant. In addition, the coating compositions of the invention form dried layers that provide excellent frictional characteristics and the siloxane-containing polyurethane lubricant does not transfer to other surfaces during the manufacture, storage, and use of the imaging element and is not removed during conventional photographic film processing, thus providing excellent lubricity to the developed film.

The imaging elements of this invention can be of many different types depending on the particular use for which they are intended. Details with respect to the composition and function of a wide variety of different imaging elements are provided in U.S. Pat. No. 5,300,676, herein incorporated by reference, and references described therein.

Imaging elements can comprise various polymeric films, papers, glass, and the like, but both acetate and polyester supports well known in the art are preferred. The thickness of the support is not critical. Support thickness of 2 to 10 mil (0.002 to 0.010 inches) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer.

The coating compositions of the invention contain a water dispersible, siloxane-containing polyurethane. Water dispersible polyurethanes are well known and are prepared by chain extending a prepolymer containing terminal isocyanate groups with an active hydrogen compound, usually a diamine or diol. The prepolymer is formed by reacting a diol or polyol having terminal hydroxyl groups with excess diisocyanate or polyisocyanate. To permit dispersion in water, the prepolymer is functionalized with hydrophilic groups. Anionic, cationic, or nonionically stabilized prepolymers can be prepared. Anionic dispersions contain usually either carboxylate or sulphonate functional comonomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized prepolymers can be prepared by the use of diol or diisocyanate co-monomers bearing pendant polyethylene oxide chains. These result in polyurethanes with stability over a wide range of pH. Nonionic and anionic groups may be combined synergistically to yield "universal" urethane dispersions. Of the above, anionic polyurethanes are by far the most significant.

Several different techniques may be used to prepare polyurethane dispersions. For example, the prepolymer may be formed, neutralized or alkylated if appropriate, then chain extended in an excess of organic solvent such as acetone or tetrahydrofuran. The prepolymer solution is then diluted with water and the solvent removed by distillation. This is known as the "acetone" process. Alternatively, a low molecular weight prepolymer can be prepared, usually in the presence of a small amount of solvent to reduce viscosity, and chain extended with a diamine just after the prepolymer is dispersed into water. The latter is termed the "prepolymer mixing" process and for economic reasons is much preferred over the former.

Polyols useful for the preparation of polyurethane dispersions include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as alkyl acrylates or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersability are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, amnioethylethanolamine and the like.

Solvents which may be employed to aid in formation of the prepolymer and to lower its viscosity and enhance water dispersibility include methylethylketone, toluene, tetrahydofuran, acetone, dimethylformamide, N-methylpyrrolidone, and the like. Water-miscible solvents like N-methylpyrrolidone are much preferred.

For the purpose of the present invention, the water dispersible polyurethane features the inclusion of siloxane bonds in its molecule. This may be accomplished either by utilizing a polysiloxane having a hydroxyl or amine group, preferably the polysiloxane is a diol or diamine in the preparation of the polyurethane. Such siloxane-containing diols or diamines are represented by the following general formula:

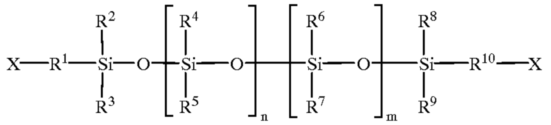

-continued

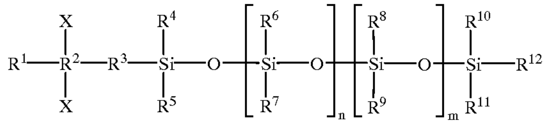

wherein: X is an amino or hydroxyl group, $R^1$, $R^2$, $R^3$, $R^4$, $R^5$, $R^6$, $R^7$, $R^8$, $R^9$, $R^{10}$, $R^{11}$ and $R^{12}$ are each independently an alkyl, aryl, or arylalkyl group, the alkyl group or alkyl portion of the arylalkyl group containing 1 to 6 carbon atoms, and n and m are each from 0 to about 500, such that the value of n+m is from 10 to about 500.

For the purpose of the present invention the siloxane-containing polyurethane comprises more than 0.25 weight % and less than 25 weight % of the siloxane component, preferably more than 1.0 weight % and less than 10 weight %. The proportion of siloxane component may be controlled within this range by regulating the value of the molecular weight of the siloxane component (n+m value in the above structures) used in the preparation of the siloxane-containing polyurethane or by using together with a polysiloxane polyol or polysiloxane diamine a conventional polyol which does not contain polysiloxane such as ethylene glycol, propylene glycol, polyether polyol, polyester polyol, polyacrylate polyol, and the like, or a conventional diamine which does not contain polysiloxane such as ethylenediamine, diaminopropane, hexamethylene diamine, hydrazine, aminoethylethanolamine and the like.

Coating compositions of the present invention may comprise the water dispersible, siloxane-containing polyurethane in combination with other water soluble or water dispersible polymers in order to tailor the physical and chemical properties of the surface protective layer for a specific imaging application. Water soluble polymers include, for example, gelatin, polyvinyl alcohol, polyvinyl pyrrolidone, cellulosics, polystyrene sulfonic acid and its alkali metal salts or ammonium salts, acrylic or methacrylic acid interpolymers, and the like. Water dispersible polymers that may be used in conjunction with the siloxane-containing polyurethane include latex interpolymers containing ethylenically unsaturated monomers such as acrylic and methacrylic acid and their esters, styrene and its derivatives, vinyl chloride, vinylidene chloride, butadiene, acrylamides and methacrylamides, and the like. Other water dispersible polymers that may be used include polyurethane and polyester dispersions. Still further water dispersible polymers that may be used are the base neutralized, carboxylic acid-containing latex polymers described in the commonly assigned copending application Ser. No. 712,006, filed Sep. 11, 1996. Preferably, the surface protective layer contains at least 2 $mg/m^2$ of the siloxane-containing polyurethane.

The surface protective layer compositions in accordance with the invention may also contain suitable crosslinking agents including aldehydes, epoxy compounds, polyfunctional aziridines, vinyl sulfones, methoxyalkyl melamines, triazines, polyisocyanates, dioxane derivatives such as dihydroxydioxane, carbodiimides, and the like. The crosslinking agents may react with the functional groups present on the siloxane-containing polyurethane, and/or the other water soluble or water dispersible polymer present in the coating composition.

Matte particles well known in the art may also be used in the surface protective layer compositions of the invention, such matting agents have been described in Research Disclosure No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The surface protective layer can contain other additives such as magnetic recording particles, abrasive particles, conductive polymers, conductive metal oxide particles, coating aids, charge control surfactants, and a secondary lubricant. There are no particular limits on the secondary lubricants that may be used. They may include, for example, perfluorinated polymers, natural and synthetic waxes, silicone fluids, stearamides, oleamides, stearic acid, lauric acid, ethylene glycol distearate, ethylene glycol monostearate, and the like.

The coating compositions of the present invention may be applied as aqueous coating formulations containing up to 20% total solids by coating methods well known in the art. For example, hopper coating, gravure coating, skim pan/air knife coating, spray coating, and other methods may be used with very satisfactory results. The coatings are dried at temperatures up to 150° C. to give dry coating weight of 20 $mg/m^2$ to 10 $g/m^2$.

The surface protective layer of the invention may be present on the side of the support opposite to the imaging layer and serve as an outermost backing layer, or an outermost layer coated on the top of an abrasion resistance backing layer, or an outermost layer coated on the top of an antistatic layer, or an outermost layer coated on a magnetic recording layer. The surface protective layer may also be used as the outermost layer on the imaging side of the support, for example as the protective overcoat for a silver halide emulsion layer.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994 and in Research Disclosure, Item 38957, September, 1996, incorporated by reference herein.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, Research Disclosure, Item 38957, September, 1996, and the references listed therein.

The photographic silver halide emulsions utilized in this invention can contain other addenda conventional in the photographic art. Useful addenda are described, for example, in Research Disclosure, Item 36544, September, 1994 and Research Disclosure, Item 38957, September, 1996. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The following examples are used to illustrate the present invention. However, it should be understood that the invention is not limited to these illustrative examples.

EXAMPLES

Examples 1 to 3 and Comparative Sample A

The following examples show that coating compositions of the invention provide stable coating formulations and yield dried films that are highly transparent and have excellent frictional characteristics (i.e., low coefficient of friction values). Protective layer coating compositions comprising a water dispersible polyurethane-polydimethyl siloxane (Neorez R9649, Zeneca Resins Inc.) containing about 5 weight % polydimethyl siloxane and a water dispersible polyurethane that does not contain a siloxane (Witcobond 232, Witco Corp.) were applied from an aqueous medium onto a polyethylene terephthalate imaging support that had been previously subbed with a vinylidene chloride-containing terpolymer latex. The coatings were dried at 100° C. to give layers with a total dried coating weight of 1000 mg/$M^2$. The coefficient of friction (COF) was determined using the methods set forth in ANSI IT 9.4-1992. The stability of the coating formulations and the appearance of the dried films were also visually evaluated. The results are listed in Table 1. The results show that coating compositions of the invention are very stable and form dried films that are transparent and have excellent lubricity.

TABLE 1

| Example | Wt % Neorez R9649 | Wt % Witcobond 232 | Formulation Stability | Coating Appearance | COF |
|---|---|---|---|---|---|
| Comparative Sample A | 0 | 100 | Excellent | Excellent | 0.43 |
| Example 1 | 2 | 98 | Excellent | Excellent | 0.21 |
| Example 2 | 5 | 95 | Excellent | Excellent | 0.18 |
| Example 3 | 10 | 90 | Excellent | Excellent | 0.14 |

Examples 4 to 6 and Comparative Sample B

The following examples show that coating compositions of the invention in which a urethane-siloxane polymer lubricant is used in a gelatin binder provide stable coating formulations and yield dried films that are highly transparent and have excellent frictional characteristics (i.e., low coefficient of friction values). Protective layer coating compositions comprising the water dispersible polyurethane-polydimethyl siloxane (Neorez R9649, Zeneca Resins Inc.), lime-processed gelatin, and bis(vinyl sulfone) methane hardener were applied from aqueous medium onto a polyethylene terephthalate imaging support that had been previously subbed with a vinylidene chloride-containing terpolymer latex. The coatings were chill-set at 4.5° C. and dried first at 21° C. and then at 38° C. to give layers with a total dried coating weight of 800 mg/$m^2$. The coefficient of friction (COF) was determined using the methods set forth in ANSI IT 9.4-1992. The stability of the coating formulations and the appearance of the dried films were also visually evaluated. The results are listed in Table 2. The results show that gelatin-containing coating compositions of the invention are very stable and form dried films that are transparent and have excellent lubricity.

TABLE 2

| Example | Wt % Neorez R9649 | Wt % Gelatin | Formulation Stability | Coating Appearance | COF |
|---|---|---|---|---|---|
| Comparative Sample B | 1.25 | 98.75 | Excellent | Excellent | 0.46 |
| Example 4 | 3.75 | 96.25 | Excellent | Excellent | 0.37 |
| Example 5 | 6.25 | 93.75 | Excellent | Excellent | 0.27 |
| Example 6 | 12.5 | 87.5 | Excellent | Excellent | 0.24 |

While it has been shown and described what are at present the preferred embodiments of the invention, various modifications and alterations will be obvious to those skilled in the art. All such modifications and alterations are intended to be included in the following claims.

What is claimed is:

1. A coating composition for use as a protective overcoat in imaging element comprising an aqueous medium having therein a combination of a water dispersible siloxane-containing polyurethane and gelatin, and wherein the siloxane comprises a siloxane-containing diol or diamine or mixtures thereof represented by the formulas:

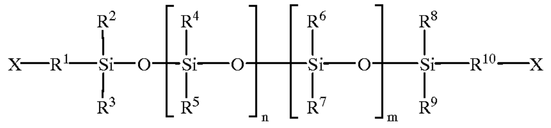

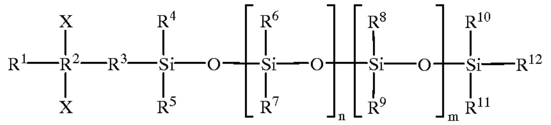

wherein: X is an amino or hydroxyl group, $R^1$, $R^2$, $R^3$, $R^4$, $R^5$, $R^6$, $R^7$, $R^8$, $R^9$, $R^{10}$, $R^{11}$, and $R^{12}$ are each independently an alkyl, aryl, or arylalkyl group, the alkyl group or alkyl portion of the arylalkyl group containing 1 to 6 carbon atoms, and n and m are each from 0 to about 500, such that the value of n plus m is from 10 to about 500.

2. The coating composition of claim 1 wherein the siloxane-containing polyurethane comprises more than 0.25 weight % and less than 25 weight % of the siloxane component.

3. The coating composition of claim 1 wherein the siloxane-containing polyurethane comprises more than 1.0 weight % and less than 10 weight % of the siloxane component.

4. The coating composition of claim 1 wherein the coating composition further comprises water dispersible polymers.

5. The coating composition of claim 1 wherein the coating composition further comprises crosslinking agents selected from aldehydes, epoxy compounds, polyfunctional aziridines, vinyl sulfones, methoxyalkyl melamines, triazines, polyisocyanates, and dioxane derivaties of dihydroxydioxane and carbodiimides.

6. The coating composition of claim 1 further comprising matte particles, magnetic recording particles, abrasive particles, conductive polymers, conductive metal oxide particles, coating aids, charge control surfactants and lubricants.

* * * * *